(12) United States Patent
Strosser et al.

(10) Patent No.: US 7,544,147 B2
(45) Date of Patent: Jun. 9, 2009

(54) APPARATUS AND METHOD PROVIDING AUTOMATIC PARK BRAKE ON AN AGRICULTURAL WINDROWER

(75) Inventors: Richard P. Strosser, Akron, PA (US); Robert L. Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 347 days.

(21) Appl. No.: 11/487,737

(22) Filed: Jul. 17, 2006

(65) Prior Publication Data

US 2007/0015626 A1    Jan. 18, 2007

Related U.S. Application Data

(60) Provisional application No. 60/699,943, filed on Jul. 16, 2005, provisional application No. 60/699,641, filed on Jul. 15, 2005, provisional application No. 60/699,490, filed on Jul. 15, 2005.

(51) Int. Cl.
   *B60W 10/00* (2006.01)
(52) U.S. Cl. ............................................. 477/96
(58) Field of Classification Search ............... 477/92, 477/96; 192/219.4
   See application file for complete search history.

(56) References Cited

U.S. PATENT DOCUMENTS

| | | | | |
|---|---|---|---|---|
| 4,355,698 | A * | 10/1982 | Barnes et al. | 180/273 |
| 4,392,544 | A * | 7/1983 | Dilno | 180/273 |
| 4,398,618 | A * | 8/1983 | Hansen | 180/273 |
| 4,892,014 | A * | 1/1990 | Morell et al. | 477/92 |
| 6,202,016 | B1 | 3/2001 | Stephenson et al. | 701/51 |
| 6,293,363 | B1 * | 9/2001 | Rangaswamy et al. | 180/287 |
| 6,663,525 | B1 | 12/2003 | McKee et al. | 475/72 |
| 6,665,601 | B1 | 12/2003 | Nielsen | 701/50 |
| 6,699,155 | B2 | 3/2004 | Nagasaka | 477/94 |
| 6,758,298 | B2 * | 7/2004 | Eberling et al. | 180/272 |
| 6,901,729 | B1 | 6/2005 | Otto et al. | 56/208 |
| 2004/0251071 | A1 | 12/2004 | Yu et al. | 180/272 |
| 2004/0255706 | A1 | 12/2004 | Bulgrien | 74/335 |
| 2005/0065689 | A1 | 3/2005 | Budde | 701/50 |
| 2007/0015628 | A1 * | 1/2007 | Fackler et al. | 477/99 |
| 2007/0034745 | A1 * | 2/2007 | Fackler et al. | 244/158.2 |

* cited by examiner

*Primary Examiner*—Dirk Wright
(74) *Attorney, Agent, or Firm*—Patrick M. Sheldrake; John William Stader; Michael G. Harms

(57) ABSTRACT

Apparatus and a method providing a park brake for a propulsion system of an agricultural windrower having a FNR lever assembly including a FNR lever movable in relation to a neutral position in first and second directions, and a sensor for sensing positions of the FNR lever as the lever is moved and outputting signals representative thereof, the sensor being configured such that the signals outputted thereby are to have signal values within a predetermined range of values and/or which will change within a predetermined rate of change, a programmable control module in operative control of a park brake and programmed and operable for monitoring the signals and comparing the values of the signals to the predetermined range, and if the value of any of the signals is outside of the predetermined range, then automatically engaging the park brake.

34 Claims, 18 Drawing Sheets

```
1  /*  MODULE:        park_brake.c

DESCRIPTION:

REVISION HISTORY:
5         15-Jul-2004 rfackler - Module created

*/

10 #include "can1_out.h"
   #include "fault_log.h"
   #include "filtfixd.h"
   #include "fnr.h"
   #include "iomap_appl.h"
15 #include "park_brake.h"
   #include "propfault.h"
   #include "propsafe.h"
   #include "propulsion.h"
   #include "steer_wheel.h"
20 #include "steering_shaft.h"
   #include "sys_vars.h"
   #include "throttle.h"
   #include "timer.h"
   #include "warning.h"
25
   /***************
      DEFINITIONS
30 ***************/

// CONSTANT
         #define _RELAY_DROP_TIME_DELAY         (_time_b0_ui2scans_sec_f( 0.10 ) )
35       #define _AUTO_BRAKE_TIME_DELAY         (_time_b0_ui2scans_sec_f( 2.00 ) )
         #define _CRITICAL_WARNING_TIME         (_time_b0_ui2scans_sec_f( 4.00 ) )
         #define _60_DEGREES_FROM_NEUTRAL       (signed int)60              // steering wheel degAngl_
         #define _80_DEGREES_FROM_NEUTRAL       (signed int)80              // steering wheel degAngl_

// ENUMERATIONS
40       static   enum _park_brake_states ( _IDLE, _PB_RELEASE_PUSHED, _NO_PARK_BRAKE, _ECONOMY_AND_SEE_PB_MANUAL_S
                                            _ACTIVELY_DESTROKE_TO_NEUTRAL, _DESTROKED_TO_NEUTRAL_DELAY, _DELAY,
                                            _WAIT_FOR_FNR_NEUTRAL, _RELAY_DELAY );

// UNITS
45
      // MACROS
         #define _PARK_BRAKE_OFF                _park_brake_relay_engage()
         #define _PARK_BRAKE_ON                 _park_brake_relay_disengage()

```
      MAPPING
      ***************/

55    // REFERENCES:

// INPUTS: DIGITAL - POSITIVE LOGIC...ON = NON-ZERO...OFF = 0.

// INPUTS: ANALOG

60    // OUTPUTS: DIGITAL - POSITIVE LOGIC...ON = NON-ZERO...OFF = 0.

// OUTPUTS: PWM TYPE

65    /***************
      VARIABLES
      ***************/

70    // GLOBAL SCOPE

// MODULE SCOPE
          static  bit                       _park_brake_relay_control_bt;
          static  signed int                _steerwheel_position_b0_si;
75        static  enum _park_brake_states   _park_brake_engine_on_state_b0_ui;
          static  unsigned char             _pbrake_msg_flag_b0_uc;
          static  unsigned char             _fnr_msg_flag_b0_uc;
          static  unsigned char             _pintle_msg_flag_b0_uc;
          static  unsigned char             _already_did_a_pbrake_msg_flag_b0_uc;
80        static  bit                       _external_park_brake_control_bt;
          static  bit                       _fault_F409_set_flag_bt;
          static  bit                       _prop_cyl_too_sluggish_bt;
          static  bit                       _prop_cyl_stuck_bt;

85    /***************
      FUNCTION PROTOTYPING - MODULE SCOPE
      ***************/
          static  void                      _park_brake_init( void );
          static  void                      _park_brake_engine_on( void );
90        static  void                      _park_brake_relay_engage( void );
          static  void                      _park_brake_relay_disengage( void );
          static  unsigned char             _out_of_FNR_neutral( void );
          static  unsigned char             _out_of_pintle_neutral( void );

95    /***********************************************************************/
      void park_brake( const unsigned int machine_mode_b0_ui )
      {
100       _PARK_BRAKE_ON;                            // default every scan - state machine will modify if needed
          switch( machine_mode_b0_ui )
```

Fig. 8

```
105     case INIT_main_STATE_MACHINE:
        case CRITICAL_EE_VARS_OUT_OF_BOUNDS:
        case WAKEUP_TEST_OUTPUTS:
        case WAKEUP_LIGHTS_ONLY:
        case NORMAL_ENGINE_OFF:
110     case NORMAL_ENGINE_STARTING:
        case CALIBRATION_ENGINE_STARTING:
        case POWER_DOWN:
        case XCM_SETUP:
            // do nothing
115         break;
        case DIAG_N_SETUP_ENGINE_OFF:
        case CALIBRATION_ENGINE_RUNNING:
120         if( _external_park_brake_control_bt )            // if somebody wants the brake released this scan
                _PARK_BRAKE_OFF;                             // release the park brake
            _external_park_brake_control_bt = FALSE;         // always clear this break;
125     case WAKEUP_APPLICATION_INIT:

park_brake_init();

130         break;

case NORMAL_ENGINE_RUNNING:

park_brake_engine_on();

135         break;

}
    // always modify the LSD output image register
140 iomap_LSDout_K53_park_brake_relay = _park_brake_relay_control_bt;    // TRUE == this state machine wants th }
145 /*************************************************************************************/
    static void _park_brake_init( void )
    {
        _pbrake_msg_flag_b0_uc = 0;
        _fnr_msg_flag_b0_uc    = 0;
150     _pintle_msg_flag_b0_uc = 0;
        _already_did_a_pbrake_msg_flag_b0_uc = 0;
        _park_brake_engine_on_state_b0_ui = _IDLE;
    }
```

*Fig. 9*

```
155  /*************************************************************/
     static void _park_brake_engine_on( void )
160  {
        static  unsigned int    _timer2_b0_ui;

/*
        FOR FMEA & FAILSAFING - AT END OF FUNCTION NEED TO TEST SW_24 INPUT TO MAKE SURE THAT THERE IS NO VOLTAGE IF THE
        _PARK_BRAKE_RELAY_CONTROL_BT == FALSE (PARK BRAKE ON)   THIS IS TO TEST THAT THE PARK BRAKE RELAY UNLATCHES AND T
165     IT'S NOT STUCK OR THAT THE J2A_11_LSD_01 CONTROL LINE ( IOMAP_LSDOUT_K53_PARK_BRAKE_RELAY ) IS NOT SHORTED TO GRO
        THERE'S NOTHING WE CAN DO EXCEPT GIVE A WARNING AND LOG A FAULT
        */

170     _steerwheel_position_b0_si = steer_wheel_degAngl_b0_si_returned();     // get steering wheel rota if( _fnr_msg_flag_b0_uc                                                // if currently queued
            && warning_status( _W014 )                                         // AND if warning message
175     )
        {
            _fnr_msg_flag_b0_uc = 0;                                           // clear the flag
            warning_remove( _W014 );                                           // remove warning message
        }
180     if( _pbrake_msg_flag_b0_uc                                             // if currently queued
            && warning_status( _W045 )                                         // AND if warning message
        )
        {
            _pbrake_msg_flag_b0_uc = 0;                                        // clear the flag
185         warning_remove( _W045 );                                           // remove warning message
        }
        if( _pintle_msg_flag_b0_uc                                             // if currently queued
            && warning_status( _W013 )                                         // AND if warning message
190     )
        {
            _pintle_msg_flag_b0_uc = 0;                                        // clear the flag
            warning_remove( _W013 );                                           // remove warning message
        }
195     switch( _park_brake_engine_on_state_b0_ui )
        {
            default:
            case _IDLE:
200             if( park_brake_release_on_bt_xp )                              // if switch pushed over t
                {
                    if( park_brake_manual_on_bt_xp )                           // this is bad if it's hig
                    {
```

Fig. 10

```
205         if( !_fault_F409_set_flag_bt )
                _fault_log_add_fault( _F409_03 );       // add brake switch fault
            _fault_F409_set_flag_bt=1;
210         break;                                       // don't go to next state
          }
          else
            _park_brake_engine_on_state_b0_ui = _PB_RELEASE_PUSHED;  // that's park brake relea 215       if( _out_of_FNR_neutral()                     // if MFH out of neutr
              && !_pbrake_msg_flag_b0_uc                // AND not displaying a pa
              && !_already_did_a_pbrake_msg_flag_b0_uc ) // AND not displaying a pa
          {
220         _already_did_a_pbrake_msg_flag_b0_uc = 1;
            _pbrake_msg_flag_b0_uc = 1;
            warning_add( _W045, 0 );                    // PARK BRAKE IS ON warnin
          }
225       if( !_out_of_FNR_neutral() )                  // if MFH in neutral
            _already_did_a_pbrake_msg_flag_b0_uc = 0;

break;
        case _PB_RELEASE_PUSHED:
230         // YOU'RE IN HERE BECAUSE THE THE BRAKE RELEASE SWITCH WAS JUST PUSHED 235         _timer2_b0_ui = 0;                          // clr the timer if( _out_of_FNR_neutral() )                 // check FNR neutral first
            {
              if( !_fnr_msg_flag_b0_uc )                // if not currently queued
              {
240             _fnr_msg_flag_b0_uc = 1;                // set this flag
                _already_did_a_pbrake_msg_flag_b0_uc = 0;
                warning_add( _W014, 0 );                // MFH OUT OF NEUTRAL warn
              }
245         _park_brake_engine_on_state_b0_ui = _IDLE;  // return to IDLE state
            }
            else
            {
250           if( _out_of_pintle_neutral() )            // then test for pintle po
              {
                if( !_pintle_msg_flag_b0_uc )
                {
                  _pintle_msg_flag_b0_uc = 1;
255               warning_add( _W013, 0 );              // STEERING NOT NEUTRAL wa
```

Fig. 11

```
                    _park_brake_engine_on_state_b0_ui = _IDLE;      // return to IDLE state
260              )
              else
              {
                    _prop_cyl_stuck_bt = FALSE;                     // TRUE == immediate br
                    _park_brake_engine_on_state_b0_ui = _NO_PARK_BRAKE;  // go to next state
              }
265       break;
          case _NO_PARK_BRAKE:
              // YOU'RE IN HERE BECAUSE THE PARK BRAKE IS RELEASED
270           _PARK_BRAKE_OFF;
              if( _out_of_FNR_neutral()                             // OK to release
275              || seat_switch_bt_xp                               //    as long as FNR is ou
                                                                    //    OR sittng in the seat
              {
                    _timer2_b0_ui = 0;                              // clr the timer
280           }
              else
              {
                    if( ++_timer2_b0_ui > _AUTO_BRAKE_TIME_DELAY )  // if it's been 2 seconds
                    {
285                   _PARK_BRAKE_ON;                               // OK to engage the brake
                      _timer2_b0_ui = 0;                            // clr the timer for use b
                      _park_brake_engine_on_state_b0_ui = _RELAY_DELAY;  // need little extra time
                    }
              }
290           if( park_brake_manual_on_bt_xp )                      // if switch flipped to pa
              {
                    if( !_out_of_FNR_neutral() )                    // if FNR is in neutral
                    {
295                   _PARK_BRAKE_ON;                               // OK to engage the brake
                      _timer2_b0_ui = 0;                            // clr the timer for use b
                      _park_brake_engine_on_state_b0_ui = _RELAY_DELAY;  // need little extra time
                    }
                    else
300                 {
                      if( economy_model_b_xp )                      // if an economy machine
                      {
                          _timer2_b0_ui = 0;                        // if so, clr the timer
                          warning_add( _W052, _CRITICAL_WARNING_TIME );  // 4 second countdown mess
305                       _park_brake_engine_on_state_b0_ui = _ECONOMY_AND_SEE_PB_MANUAL_SW;  // go to this state
                      }
```

*Fig. 12*

```
            else
            {
                // first look to see if the propulsion power has been dropped because of prop safe action
310             if( !propsafe_get_prop_enabled_logic_b_xp() )        // FALSE = disabled; TRUE
                {
                    _PARK_BRAKE_ON;                                  // OK to engage the brake
                    _timer2_b0_ui = 0;                               // clr the timer for use b
                    _park_brake_engine_on_state_b0_ui = _RELAY_DELAY; // need little extra time
                }
315             else
                    _park_brake_engine_on_state_b0_ui = _ACTIVELY_DESTROKE_TO_NEUTRAL;  // deluxe machine - go
            }
        }
320     else
        {
            if( deluxe_model_b_xp && _prop_cyl_stuck_bt )            // TRUE == immediate brake
            {
                _PARK_BRAKE_ON;                                      // OK to engage the brake
325             warning_add( _W052, 0 );                             // critical warning that w
                _timer2_b0_ui = 0;                                   // clr the timer for use b
                _park_brake_engine_on_state_b0_ui = _WAIT_FOR_FNR_NEUTRAL;  // this will bring the bra
            }
        }
330     break;

case _ECONOMY_AND_SEE_PB_MANUAL_SW:        // FOR NON PROPULSION-BY-WIRE MACHINES
335         // - you're in here because you may be in FNR neutral but he switched park brake manual on before
            // OR - you're in here because we were out of neutral and for some reason he pushed the manual park b
            // possibly it's an emergency situation so we will not care about looking at the pintle pot - all we
            // that the FNR comes back to neutral. When it does then we will apply the brake right away.
340         _PARK_BRAKE_OFF;                                         // keep park brake off if( !park_brake_manual_on_bt_xp )                        // if he released the park
            {
345             warning_remove( _W052 );                             // clr the timer
                _timer2_b0_ui = 0;                                   // go back to this state
                _park_brake_engine_on_state_b0_ui = _NO_PARK_BRAKE;
            }

350         if( ++_timer2_b0_ui > _CRITICAL_WARNING_TIME             // if it's been 4 secon
                || !_out_of_FNR_neutral() )                          // OR has come back to neu
            {
                _PARK_BRAKE_ON;                                      // OK to engage the brake
355             warning_remove( _W052 );                             // MFH OUT OF NEUTRAL warn
                warning_add( _W014, 0 );                             // clr the timer for use b
                _timer2_b0_ui = 0;
```

*Fig. 13*

```
                _park_brake_engine_on_state_b0_ui = _WAIT_FOR_FNR_NEUTRAL;      // need little extra time
            )
        break;

360     case _ACTIVELY_DESTROKE_TO_NEUTRAL:      // FOR PROPULSION-BY-WIRE MACHINES // - you're in here because you may be in FNR neutral but he switched park brake manual on before
365         // OR - you're in here because we were out of neutral on a propulsion-by-wire machine and for some re
            // manual park brake switch possibly it's an emergency situation so we will actively destroke the pro
            // and then apply the brake.

_PARK_BRAKE_OFF;                                                    // keep park brake off 370         if( _6_cylinder_b_xp )                                              // want to throttle back a
                throttle_set_to_low_idle();

propulsion_ESTOP_state_machine_started_by_park_brake();             // this will actively dest
375         warning_add( _W052, 0 );                                            // critical warning that w
            _timer2_b0_ui = 0;                                                  // clr the timer for use b
            _prop_cyl_too_sluggish_bt = FALSE;                                  // clr this before we adva
            _park_brake_engine_on_state_b0_ui = _DESTROKED_TO_NEUTRAL_DELAY;    // next state wait for pro
        break;

380     case _DESTROKED_TO_NEUTRAL_DELAY:        // for propulsion-by-wire machines _PARK_BRAKE_OFF;                                                    // keep park brake off 385         if( steering_shaft_neutral_status_xp() )                            // test for steering shaft
            {
                _timer2_b0_ui = 0;                                              // clr the timer for use b
                _park_brake_engine_on_state_b0_ui = _DELAY;                     // this will bring the bra
            }
390         if( ++_timer2_b0_ui > _time_b0_ui2scans_sec_f( 3.0 )                // must get there with1
            || !_out_of_FNR_neutral()                                           // OR has come back to neu
            )
            {
395             _park_brake_engine_on_state_b0_ui = _WAIT_FOR_FNR_NEUTRAL;      // this will bring the bra
            }

// look to see if a propulsion problem will require immediate braking
            if(  !propsafe_get_prop_enabled_logic_b_xp()
400         ||    !iomap_digin_swstate_S1i_hi_gnd_speed.debounced               // if prop power
             ||    R23A_AtoD_b0_ui_to_v_b1l_ui() < ee_steering_shaft_primary_neutral_v_b1l_ui   // OR if in low-spee
             ||    R23B_AtoD_b0_ui_to_v_b1l_ui() > ee_steering_shaft_secondary_neutral_v_b1l_ui // OR if were going
                 _prop_cyl_too_sluggish_bt                                                       // OR if were going
405          ||    iomap_anin_12VD_power_filtered < _SYSTEM_5_VOLT_THRESHOLD                     // OR if prop cyl >
            )                                                                                    // OR if no +12VD pr
```

Fig. 14

```
         _PARK_BRAKE_ON;                                          // OK to engage the brake
410      _timer2_b0_ui = 0;                                       // clr the timer for use b
         _park_brake_engine_on_state_b0_ui = _WAIT_FOR_FNR_NEUTRAL; // this will bring the bra
         }
415      break;
         case _DELAY:

420        _PARK_BRAKE_OFF;                                       // keep park brake off
           if( ++_timer2_b0_ui > _time_b0_ui2scans_sec_f( 0.75 ) )
             _park_brake_engine_on_state_b0_ui = _WAIT_FOR_FNR_NEUTRAL; // this will bring the bra
         break;
425      case _WAIT_FOR_FNR_NEUTRAL:

if( !_out_of_FNR_neutral() )                           // when FNR brought back 1
           {
430          _timer2_b0_ui = 0;                                   // clr the timer for use b
             if( economy_model_b_xp )
             {
435            warning_remove( _W014 );                           // MFH OUT OF NEUTRAL warn
               _park_brake_engine_on_state_b0_ui = _RELAY_DELAY;  // need little extra time
             }
             else
             {
440            warning_remove( _W052 );                           // need little extra time
               _park_brake_engine_on_state_b0_ui = _RELAY_DELAY;
             }
           }
445      break;
         case _RELAY_DELAY:

if( ++_timer2_b0_ui > _RELAY_DROP_TIME_DELAY )         // need little extra time
             _park_brake_engine_on_state_b0_ui = _IDLE;           // this will bring the bra
450      break;

}
455    }
/*******************************************************************************/
static void _park_brake_relay_engage( void )
{
```

*Fig. 15*

```
460         _park_brake_relay_control_bt = TRUE;              // TRUE == this state mach
        }
        /*************************************************/
465     static void _park_brake_relay_disengage( void )
        {
            _park_brake_relay_control_bt = FALSE;             // FALSE == this state mac
        }
470     /*************************************************/
        void external_park_brake_release( void )
        {
            _external_park_brake_control_bt = TRUE;           // TRUE == this state mach
475     }
        /*************************************************/
        void set_prop_cyl_too_sluggish_bt( void )
480     {
            _prop_cyl_too_sluggish_bt = TRUE;                 // TRUE == immediate brake en
        }
        /*************************************************/
485     void set_prop_cyl_stuck_bt( void )
        {
            _prop_cyl_stuck_bt = TRUE;                        // TRUE == immediate brake engagement
490     }
        /*************************************************/
        static unsigned char _out_of_FNR_neutral( void )
495     /*
         1 way to check neutral on economy machines
            - steering_shaft_neutral_status_xp() from R02 FNR lever potentiometer
         3 ways to check neutral on propulsion-by-wire machines - 2 involve mechanical position of the FNR handle
            - S03 FNR neutral switch  iomap_digin_swstate_S03_fnr_neutral.debounced
500         - but only good if there is +12VD power to the propulsion circuit
            - R18 FNR potentiometer  AtoD_b0_u1_to_v_b11_si( iomap_anin_R18_fnr_handle_position.raw )
            - check (software-intended) neutral involving the +12VD propulsion cylinder HSD power
        */
505     if( economy_model_b_xp )
        {
            if( !steering_shaft_neutral_status_xp() )          // if the FNR lever
                return( TRUE );                                // indicate yes we're out
            else
510             return( FALSE );                               // indicate we're in neutr
```

Fig. 16

```
        )
        else
        {
515         if( mfh_is_back_to_neutral_status_xp() )
                return( FALSE );                              // indicate we're in neutr
            else
                return( TRUE );                               // indicate yes we're out
        }
520 }

/****************************************************************/
    static unsigned char _out_of_pintle_neutral( void )
525 {
        signed int    _temp2_b0_si;

// Have to do it this way - TASKING's having a problem testing if signed int < 0
        _temp2_b0_si = _steerwheel_position_b0_si;
530     if( _steerwheel_position_b0_si > 0 )
            _temp2_b0_si = -_steerwheel_position_b0_si;       // invert and assign to te if( _temp2_b0_si >= _80_DEGREES_FROM_NEUTRAL )        // invert again to get it
535         return( TRUE );                                   // wheel is too far from n
        else
            return( FALSE );                                  // within the neutral rang
    }

/****************************************************************/
    static unsigned char _pintle_is_moving( void )
540 {
        unsigned int  _difference_steer_wheel_degAngl_b0_ui;

545     _pintle_movement.raw_ul = (unsigned long)((signed int)_steerwheel_position_b0_si + 1000);   // add an offset
        LONG_FILTER128( _pintle_movement );                   //at 10ms scan rate rise t 550     if( _pintle_movement.raw_ul >= _pintle_movement.filtered_ul )
            _difference_steer_wheel_degAngl_b0_ui = _pintle_movement.raw_ul - _pintle_movement.filtered_ul;
        else
            _difference_steer_wheel_degAngl_b0_ui = _pintle_movement.filtered_ul - _pintle_movement.raw_ul;

555     _difference_steer_wheel_degAngl_b0_ui >>= 5;          // divide by 32 to lessen
    //  _difference_steer_wheel_degAngl_b0_ui >>= 6;          // divide by 64 to lessen if( !_difference_steer_wheel_degAngl_b0_ui )
560         return( FALSE );                                  // steering wheel not bein
        else
```

*Fig. 17*

```
// steering wheel is movin
```

*Fig. 18*

```
return( TRUE );
}
*/
```

565 ns # APPARATUS AND METHOD PROVIDING AUTOMATIC PARK BRAKE ON AN AGRICULTURAL WINDROWER

This application claims the benefit of U.S. Provisional Application No. 60/699,641, filed Jul. 15, 2005; U.S. Provisional Application No. 60/699,490, filed Jul. 15, 2005; and U.S. Provisional Application No. 60/699,943, filed Jul. 16, 2005.

TECHNICAL FIELD

The present invention relates to vehicular park brakes and, more particularly, to apparatus and a method providing automatic park brake operability for a propulsion system of an agricultural windrower.

BACKGROUND OF THE INVENTION

U.S. Provisional Application Nos. 60/699,641, and 60/699,490, both filed Jul. 15, 2005, and U.S. Provisional Application No. 60/699,943, filed Jul. 16, 2005, are incorporated herein in their entirety by reference. U.S. Pat. No. 6,901,729 is also incorporated herein in its entirety by reference.

Vehicles, such as, but not limited to, agricultural windrowers, can utilize control algorithms for translating input signals, for instance, from operator controlled input devices such as a forward-neutral-reverse (FNR) lever, also sometimes referred to as a multi-function-handle (MFH), to systems to be controlled thereby, such as the propulsion driveline.

It is therefore desirable to have a capability to monitor the performance of such control algorithms, to ensure that the input commands are being accurately and safely translated into machine operations and movements. This can be generally referred to as propulsion system safeing. It is also desirable to have the capability to determine or sense when a controlled system, such as a propulsion driveline, is no longer tracking a reference input signal sufficiently well. A degradation in the tracking capability can occur for any of several reasons, such as an interrupted or corrupted communication path, such as due to electrical noise and/or damage to a conductive path such as a wiring harness, physical wear or damage, and the like. It is also desirable to have the ability to determine or sense when the controlled system is overshooting or undershooting a system bounds. For instance, a propulsion system may drive a vehicle such as a windrower at a speed greater than a set speed. A system can overshoot (measured system output exceeds the desired output value) or undershoot (measured system output is less than the desired output value), which may indicate that a controller for the output has become unstable. Safeing in the instance of these conditions, will provide a manner of returning to a safe mode, which can include automatically going to a neutral mode, and/or shutting down the propulsion system.

It is also desirable to have the capability for providing an automatic park brake for ensuring that when the FNR lever is moved to the neutral position, or is already in the neutral position, the windrower is prevented from moving either in the forward, or the reverse direction.

SUMMARY OF THE DISCLOSURE

Accordingly, what is disclosed is apparatus and a method for providing an automatic park brake for a propulsion system of an agricultural windrower.

According to the invention, a FNR lever assembly includes a FNR lever having a neutral position and is movable in relation to the neutral position in a first direction and in a second direction opposite the first direction. At least one sensor is disposed and operable for sensing positions of the FNR lever as the lever is moved in the first and second directions and outputting signals representative thereof, and is configured such that the signals outputted thereby are to have signal values within a predetermined range of values. A programmable control module is connected with the at least one sensor for receiving the signals therefrom, and is connected in operative control of a park brake of the windrower, and the control module being programmed and operable for monitoring the signals and comparing the values of the signals to the predetermined range, and if the value of any of the signals is outside of the predetermined range, then automatically engaging the park brake. The park brake engagement can be immediate, or may be preceded by a controlled deceleration of the vehicle.

According to another aspect of the invention, the at least one sensor is configured such that the signals outputted thereby as the FNR lever is moved are to change at a rate within a predetermined range of rates of change; and the programmable control module is programmed and operable for monitoring the signals and comparing the rates of change thereof to the predetermined range of rates of change, and if any of the rates of change of the signals is outside of the predetermined range, then automatically engaging the park brake.

According to another aspect of the invention, the signals outputted by the at least one sensor are voltage signals, and the predetermined range comprises a voltage range, and the at least one sensor can be a potentiometer.

According to still another aspect of the invention, a relay is provided and energizable for providing power to the propulsion driveline, the control module being connected in operative control of the relay, and the control module being operable for engaging the park brake by de-energizing the relay.

According to still another aspect of the invention, the control module is programmed such that when the park brake is engaged and an engine of the windrower is operating, the control module is operable for disengaging the park brake when the FNR lever is in the neutral position and a steering mechanism of the windrower is set within a predetermined range from a straight ahead position.

In another aspect of the invention, the control module is programmed to engage the park brake if a start switch in connection with the control module is in an off position. And, a seat switch is operable for indicating when an operator is seated on a seat of the windrower, and the control module is programmed to engage the park brake if the FNR lever is in the neutral position and the seat switch indicates that an operator is not seated on the seat for longer than a predetermined time. The FNR lever assembly can also include a neutral switch in connection with the control module, the neutral switch having a first operating state when the FNR lever is in the neutral position and a second operating state when the FNR lever is out of the neutral position, and the control module is programmed to automatically engage the park brake if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

According to still another aspect of the invention, the propulsion driveline includes a propulsion cylinder movable through a predetermined range of positions for effecting operation of the propulsion driveline within a predetermined range of speeds, and a sensor configured and operable for sensing a position of a propulsion cylinder and outputting signals representative thereof to the control module. Here, the control module is programmed to compare the signals representative of the positions of the propulsion cylinder to the signals representative of the positions of the FNR lever, and engage the park brake if the signals representative of the positions of the propulsion cylinder do not correspond to the signals representative of the positions of the FNR lever so as to indicate that the propulsion cylinder is sticking in a position.

The apparatus can also include a key switch and a park brake switch in connection with the control module, and wherein the control module is programmed to allow operation of the key switch for initiating engine starting only when the park brake switch is in a state for engaging the park brake. As another feature, the hard wired circuitry is configured such that the park brake must be re-released after a key-off/key-on cycle.

As a result, an advantage of the invention is that, to turn the start key on the operator must engage the parking brake. This is done by a momentary switch activation.

Another advantage is that the park brake must be disengaged to allow power to a propulsion control latching circuit which allows power to the propulsion controls.

As another advantage, the FNR lever must be moved out of the neutral position to latch a latching circuit for sending power to the propulsion controls.

Still further advantages include that the park brake automatically engages during certain fault conditions, including: if the start switch is turned off; the FNR lever is in neutral and the operator leaves the operator's seat for a predetermined time; the propulsion system is not engaging, or is stuck; there is a problem with the FNR sensor; the rate of change of the FNR sensor is out of an expected range; and if the relationship between the FNR sensor and the neutral switch do not match the expected states.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a listing of code of a computer program incorporating steps of a preferred embodiment of the method of the invention;

FIG. 8 is a continuation of the listing;
FIG. 9 is a continuation of the listing;
FIG. 10 is a continuation of the listing;
FIG. 11 is a continuation of the listing;
FIG. 12 is a continuation of the listing;
FIG. 13 is a continuation of the listing;
FIG. 14 is a continuation of the listing;
FIG. 15 is a continuation of the listing;
FIG. 16 is a continuation of the listing;
FIG. 17 is a continuation of the listing; and
FIG. 18 is a continuation of the listing.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
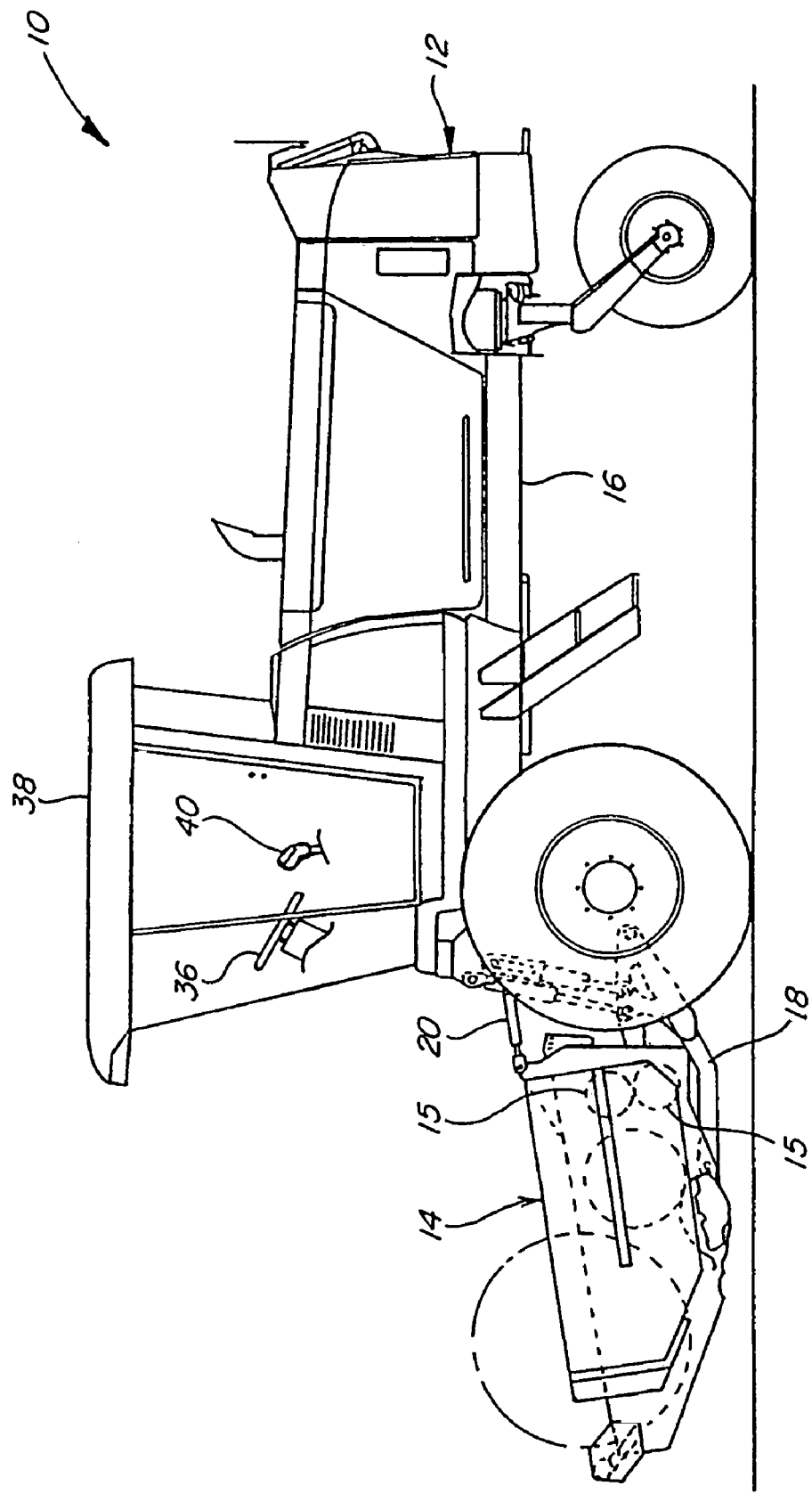
FIG. 1 is a side elevational view of a windrower of the type with which the invention may be used, including a header for severing crops from a field, mounted on a front end of the windrower.
Figure 2:
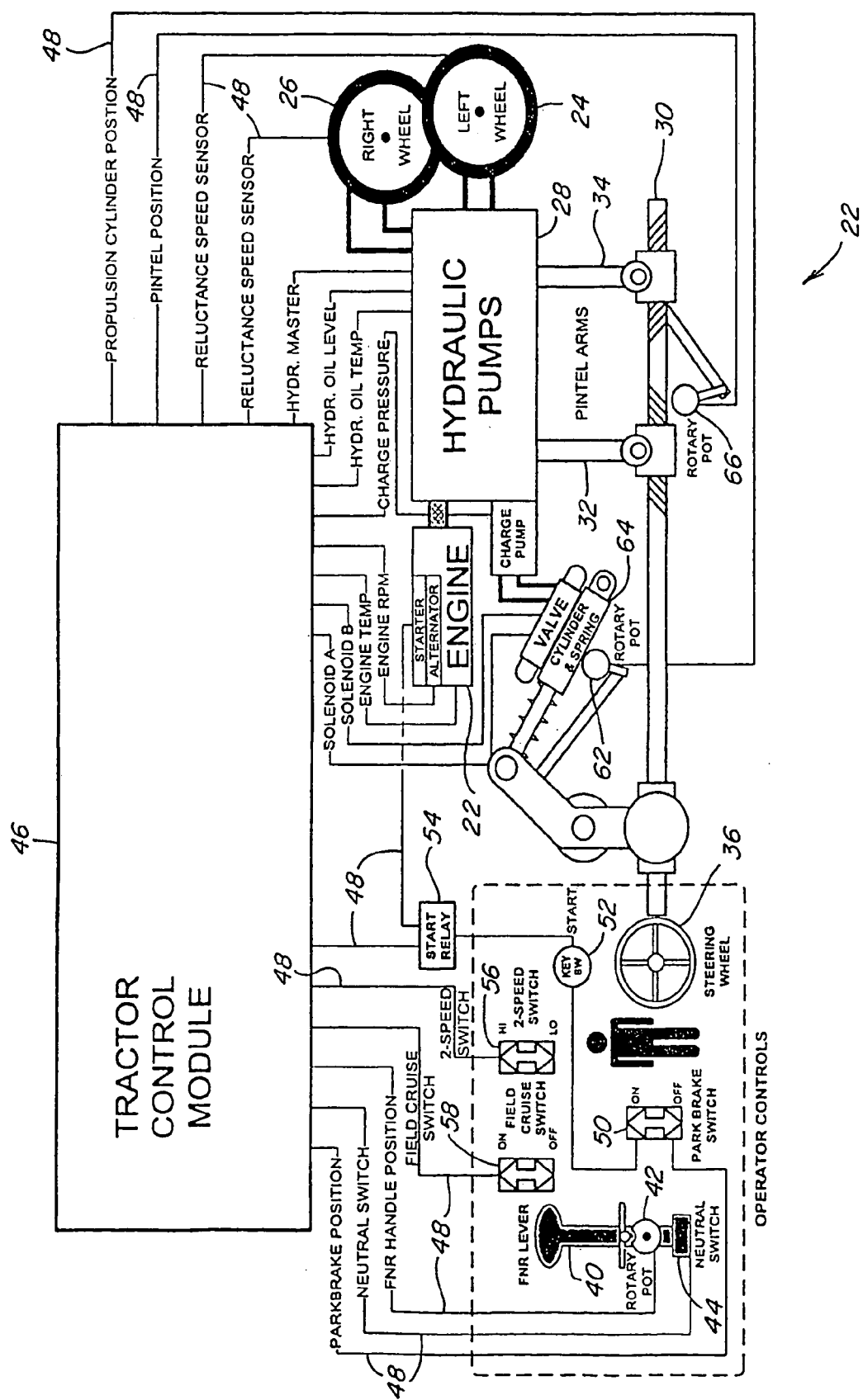
FIG. 2 is a simplified diagrammatic representation of a propulsion driveline of the windrower incorporating aspects of the instant invention.
Figure 3:
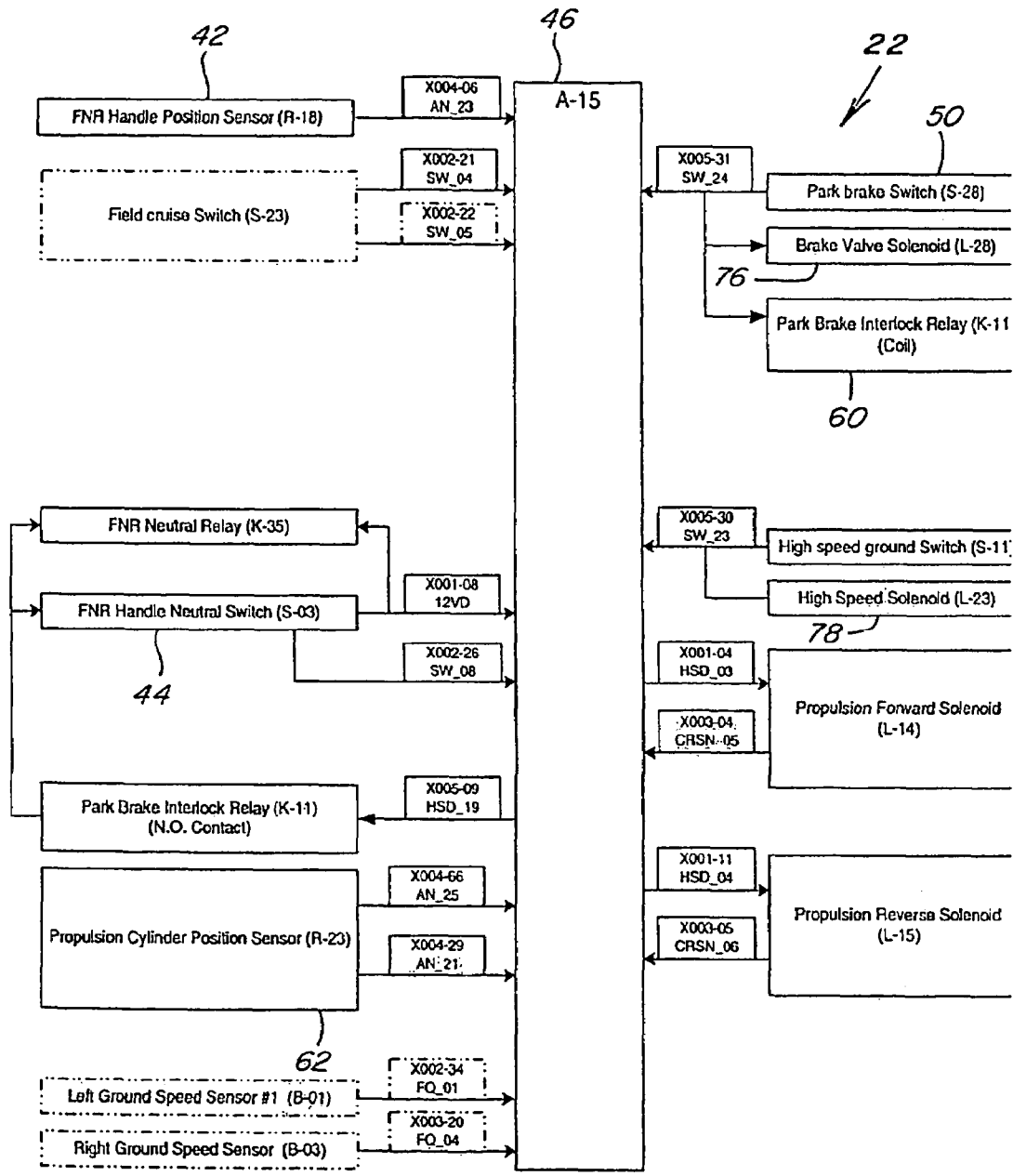
FIG. 3 is a schematic of circuitry of the propulsion driveline.
Figure 4:
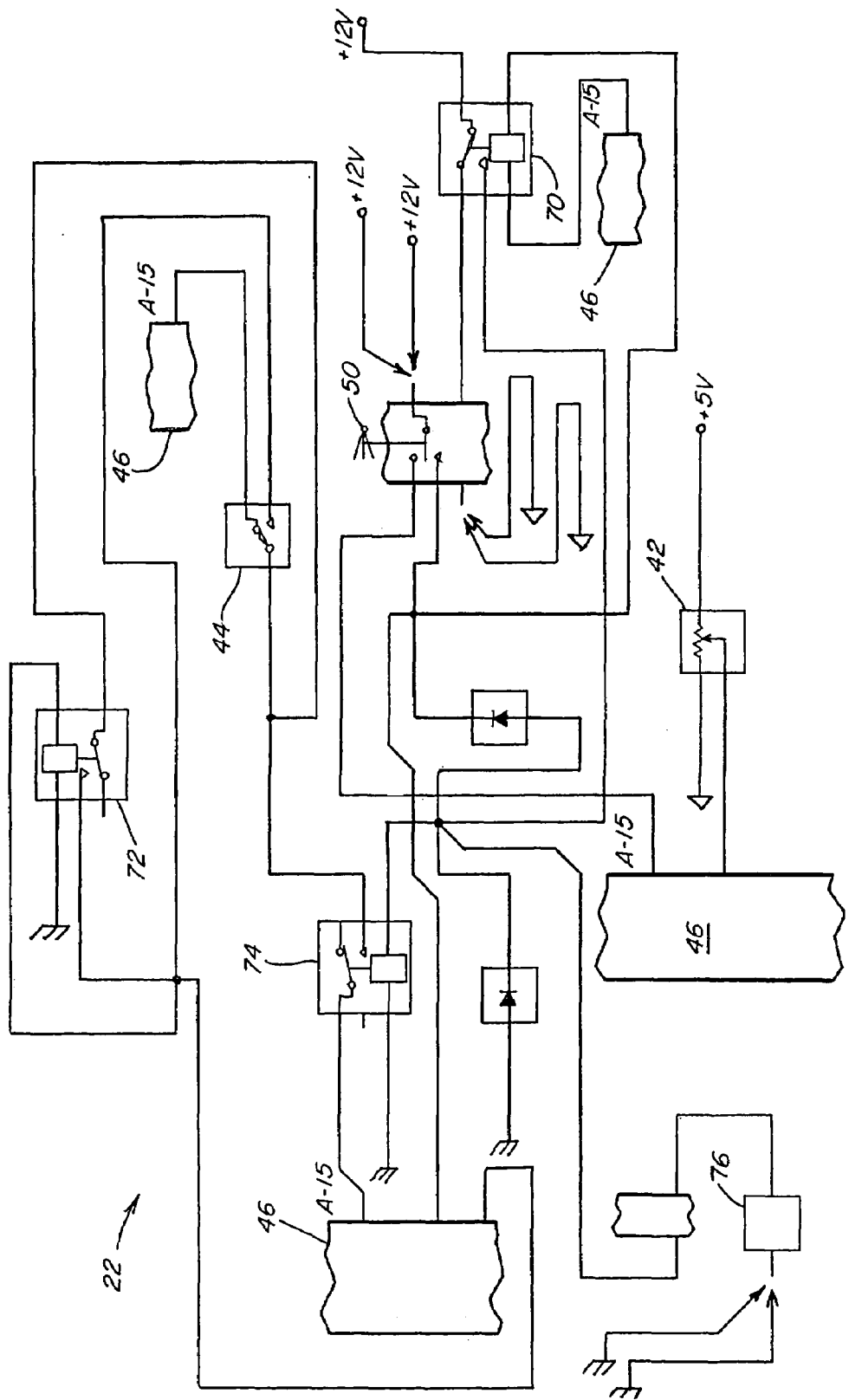
FIG. 4 is a schematic of other aspects of circuitry of the propulsion driveline.
Figure 5:
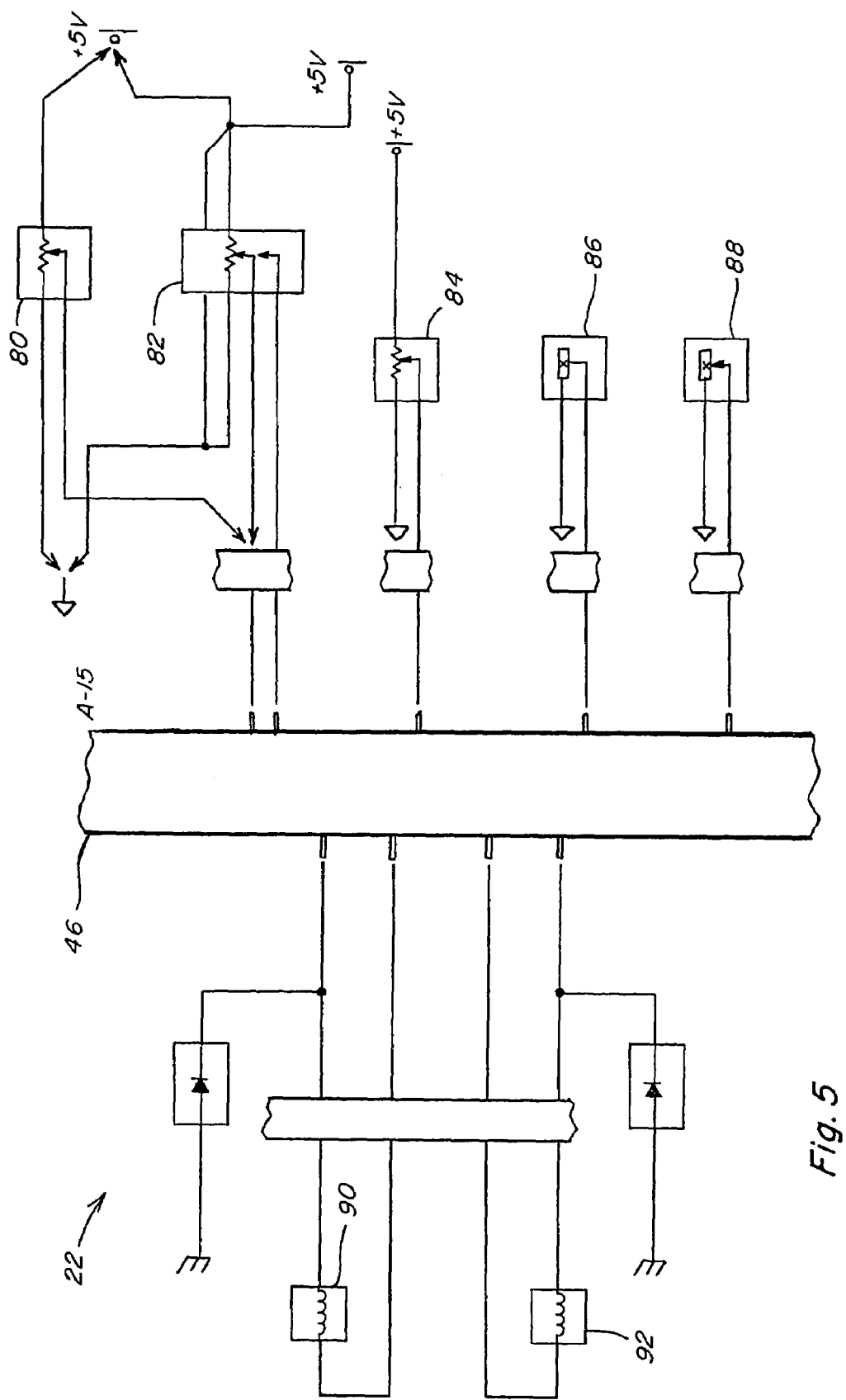
FIG. 5 is another schematic of circuitry of the propulsion driveline.
Figure 6:
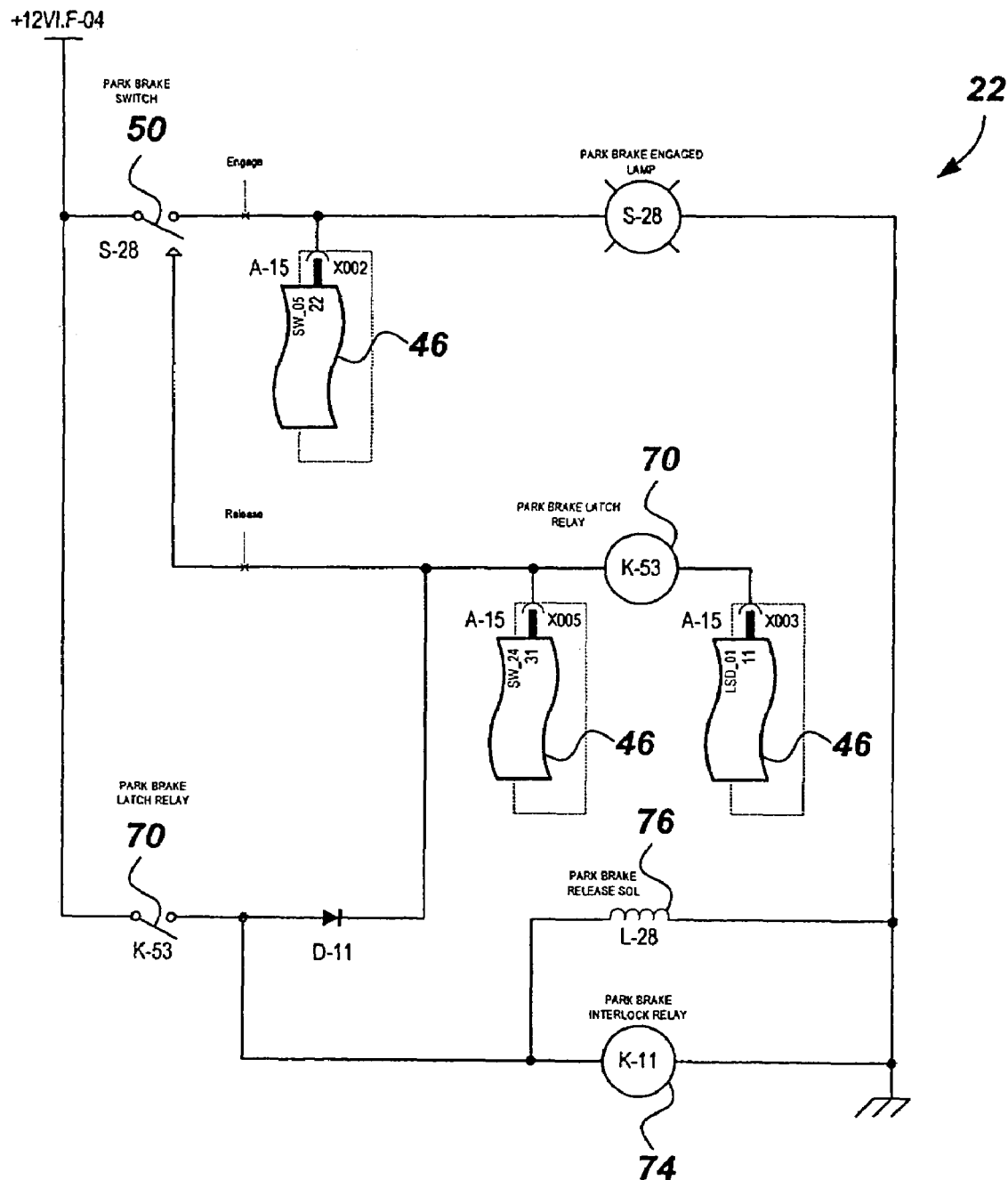
FIG. 6 is another schematic of circuitry of the propulsion driveline.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Referring also to FIGS. 2, 3, 4 and 5, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, including a rotary potentiometer 42 and a neutral switch 44, each of which is connected to a tractor control module 46 via a suitable conductive path or paths 48, which can be, for instance, a wire or wires of a wiring harness, an optical path, a wireless path, or the like. Movements of FNR lever 40 in relation to the neutral position will cause potentiometer 42 to output varying signals representative of the position of lever 40, which signals comprise voltages. It is desired for these voltage signals to very precisely indicate the position of lever 40, such that precise control of the forward and rearward movements of windrower 10 can be achieved.

For safeing purposes according to the instant invention, potentiometer 42 is mounted and configured so as to be jointly rotated by movements of FNR lever 40 to cause changing voltage outputs therefrom.

Neutral switch 44 is also mounted and configured such that movements of FNR lever 40 into the neutral position, and out of the neutral position, will cause changes in the operating state of switch 44. Here, forward and rearward movements of FNR lever 40 from a generally straight up neutral position shown, with a park brake switch in a state to disengage the park brake, will effect a change of state of switch 44 which will be outputted to control module 46, which will responsively power up the propulsion driveline, control module 46 controlling the propulsion speed of windrower 10 as a function of the voltage outputs of potentiometer 42. Similarly, rearward movement of FNR lever 40 from the neutral position will effect a change of state of switch 44 outputted to control module 46 to effect operation of the propulsion driveline in the reverse direction if the park brake is in a disengaged state, and the voltage output of one or both of the potentiometers 42 will be used to control reverse speed. It is also desired that, when lever 40 is moved into the neutral position, the propulsion system be controlled to positively de-stroke or otherwise transition into a non-propelling state over time, such that abrupt stoppage does not occur.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48.

Control module 46 is in connection with a dual rotary potentiometer 62 via a conductive path 48, potentiometer 62 being operable for outputting information representative of the position of a propulsion cylinder 64. Propulsion cylinder 64 is extendable and retractable by solenoids controlled by control module 46, based on the voltage outputs of potentiometer 42, to move propulsion rod 30 longitudinally for changing the stroke of the hydraulic pumps 28 via the angle of the pintel arms 32 and 34, for effecting propulsion of the windrower. A rotary potentiometer 66 is operable for outputting information representative of the position of pintel arms 32 and 34 to module 46 via another conductive path 48, providing information representative of differential stroking of pumps 28 to effect steering movements. Information representative of speed of respective wheels 24 and 26 is determined by reluctance speed sensors and communicated via conductive paths 48 to module 46. Differences in the speed readings is also indicative of steering movements.

Other illustrated elements of propulsion driveline 22 include a park brake latch relay 70; a propulsion enable relay 72; a propulsion interlock relay 74; a brake valve solenoid 76; a ground speed high solenoid 78; propulsion cylinder position sensors 80 and 82 incorporating dual rotary potentiometer 62 (FIG. 2); a pintel arm position sensor 84 incorporating rotary potentiometer 66 (also FIG. 2); left and right ground speed sensors 86 and 88; a propulsion forward solenoid 90; and a propulsion reverse solenoid 92.

As noted above, the instant invention utilizes control module 46 to monitor the propulsion command inputted thereto by potentiometer 42 indicative of the position of FNR lever 40. Essentially, the output of only one of the potentiometers 62 is required for signaling propulsion commands or inputs, but two are used (dual Hall tracking) and the voltage outputs are continually summed. If the sum does not equal a predetermined value, here 5 V, it is determined that an error in the voltage signal of one or both of the potentiometers is determined. The output of potentiometer 62 is indicative of the position of propulsion cylinder 64 of the propulsion driveline 22. The position of propulsion cylinder 64 (and thus the output of potentiometer 62) should, if normally operating, correspond to or track the inputted command from potentiometer 42, modified by a transfer function, with consideration of normal deviations such as due to hysteresis, time lag in executing the propulsion commands, and the like. dv/dt (changing voltage over time) thresholding of the FNR potentiometer is used to identify/evaluate additional faults.

Reference input commands (e.g., voltages inputted through the position of FNR lever 40 by potentiometer 42) are matched with responsive system/hardware outputs (e.g., voltages outputted by potentiometer 62) to derive tracking errors e by control module 46. Tracking errors e are processed to determine any faults. This is preferably done using an exponentially decaying integrator, also used for integration of current errors, to give the algorithm a forgetting type property wherein the most recent error signals are weighted more heavily than ones further in the past. A predetermined threshold is set on this exponentially decaying integrator to indicate when the controlled system is no longer tracking sufficiently well. When the value of the exponentially decaying integrator exceeds the threshold, appropriate action is taken to preserve the integrity and safety of the system, which can include outputting of a fault signal to the operator, an automatic system shutdown, or the application of the park brake according to the invention.

Another algorithm for monitoring the controller stability checks bounds. When the system is overshooting (measured system output exceeds the desired output value) or undershooting (measured system output is less than the desired output value) it is checked to make sure that the measured output value isn't at a corresponding saturation limit of the hardware, which would be an indication that the controller has become unstable, and the propulsion driveline shut down, including the automatic application of the park brake.

Essentially, if there is a fault, solenoids A and B (FIG. 2) controlling the valve which directs hydraulic fluid to the chambers of propulsion cylinder 64 are de-energized, to allow the spring associated with propulsion cylinder 64 to take propulsion rod 30 to neutral, and the park brake is allowed to be applied.

Referring also to FIGS. 7-18, lines of code of an actual computer program embodying the steps of the method of the invention for providing automatic park brake operation is disclosed. The notes accompanying the lines of code describe many features of the method of the invention. In the code, the FNR lever is identified as the MFH.

As one mode of operation, if the signal values outputted by potentiometer is outside of a predetermined range, control module 46 is automatically operable for engaging the park brake. This can involve, for instance de-energizing park brake latch relay 70.

As another function, control module 46 can be programmed such that when the park brake is engaged and an engine of the windrower is operating, the control module disengages the park brake (de-energizes or unlatches relay 70) when FNR lever 40 is in the neutral position and steering wheel 36 is set within a predetermined range from a straight ahead position, which range can be, for instance, but is not limited to, 800 in either direction from a straight ahead position.

As another function, control module 46 can be programmed to engage the park brake if start switch 52 is switched to its off position. The hard wired circuitry also requires re-release of the park brake after a key-off/key-on cycle.

As still another function, control module 46 can be programmed to engage the park brake if FNR lever 40 is in the neutral position and a seat switch indicates that an operator has not been seated on an operator seat of the windrower for a predetermined time.

In another mode, control module 46 is programmed to automatically engage the park brake if potentiometer 42 is outputting signals representative of FNR lever 40 being in a position other than the neutral position and neutral switch 44 is in an operating state representative of FNR lever 40 being in the neutral position; and if the potentiometer signals are representative of FNR lever 40 being in the neutral position and neutral switch 44 is in an operating state representative of FNR lever 40 being in other than the neutral position.

Also, if a comparison of the signals outputted by potentiometers 42 and 62 indicate that propulsion cylinder 64 is stuck, control module 46 can automatically engage the park brake.

Controller 46 can also be programmed to only allow operation of key switch 52 for initiating operation of propulsion driveline 22 when park brake switch 50 is in a state for disengaging the park brake.

Still further, as another mode, control module 46 can be programmed such that when the comparison of the rate of change of the FNR lever position and the rate of change of the propulsion cylinder position are different, the park brake can automatically be engaged. The park brake engagement can be immediate, or may be preceded by a controlled deceleration of the vehicle. Other features include the automatic engagement of the park brake (zero machine state) when electrical power is removed and/or if hydraulic power is removed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. Apparatus for controlling a propulsion driveline of an agricultural windrower, comprising:
   a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby are to have signal values within a predetermined range of values; and
   a programmable control module in connection with the at least one sensor for receiving the signals therefrom, the control module being connected in operative control of a park brake of the windrower, and the control module being programmed and operable for monitoring the signals and comparing the values of the signals to the predetermined range, and if the value of any of the signals is outside of the predetermined range, then automatically engaging the park brake.

2. The apparatus of claim 1, wherein the signals outputted by the at least one sensor comprise voltage signals, and the predetermined range comprises a voltage range.

3. The apparatus of claim 1, wherein the at least one sensor comprises a potentiometer.

4. The apparatus of claim 1, comprising a relay energizable for providing power to the propulsion driveline, the control module being connected in operative control of the relay, and the control module being operable for engaging the park brake by de-energizing the relay.

5. Apparatus of claim 1, wherein the control module is programmed such that when the park brake is engaged and an engine of the windrower is operating, the control module is operable for permitting the operator to disengaging the park brake when the FNR lever is in the neutral position and a steering mechanism of the windrower is set within a predetermined range from a straight ahead position.

6. Apparatus of claim 1, wherein the control module is programmed to engage the park brake if a start switch in connection with the control module is in an off position.

7. Apparatus of claim 1, wherein the control module is programmed to engage the park brake if the FNR lever is in the neutral position and a seat switch indicates that an operator has not been seated on an operator seat of the windrower for a predetermined time.

8. Apparatus of claim 1, wherein the FNR lever assembly includes a neutral switch in connection with the control module, the neutral switch having a first operating state when the FNR lever is in the neutral position and a second operating state when the FNR lever is out of the neutral position, and wherein the control module is programmed to automatically engage the park brake if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

9. Apparatus of claim 1, wherein the propulsion driveline includes a propulsion cylinder movable through a predetermined range of positions for effecting operation of the propulsion driveline within a predetermined range of speeds, and a sensor configured and operable for sensing a position of a propulsion cylinder and outputting signals representative thereof to the control module, and the control module being programmed to compare the signals representative of the positions of the propulsion cylinder to the signals representative of the positions of the FNR lever, and engaging the park brake if the signals representative of the positions of the propulsion cylinder do not correspond to the signals representative of the positions of the FNR lever so as to indicate that the propulsion cylinder is sticking in a position.

10. Apparatus of claim 1, comprising a key switch and a park brake switch in connection with the control module, and wherein the control module is programmed to allow starting of an engine only when the park brake switch is in a state for disengaging the park brake.

11. Apparatus of claim 1, wherein the at least one sensor is configured such that the signals outputted thereby as the FNR lever is moved are to change at a rate within a predetermined range of rates of change; and
wherein the programmable control module is programmed and operable for monitoring the signals and comparing the rates of change thereof to the predetermined range of rates of change, and if any of the rates of change of the signals is outside of the predetermined range, then automatically engaging the park brake.

12. Apparatus for providing an automatic park brake for an agricultural windrower, comprising:
a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby as the FNR lever is moved are to change within a predetermined range of rates of change; and
a programmable control module in connection with the at least one sensor for receiving the signals therefrom, the control module being connected in operative control of a park brake of the windrower, and the control module being programmed and operable for monitoring the signals and comparing the rates of change thereof to the predetermined range of rates of change, and if any of the rates of change of the signals is outside of the predetermined range, then actuating the park brake.

13. The apparatus of claim 12, wherein the signals outputted by the at least one sensor comprise voltage signals, and the predetermined range of rates of change comprises a range of rates of voltage change.

14. The apparatus of claim 12, wherein the at least one sensor comprises a potentiometer.

15. The apparatus of claim 12, comprising a relay energizable for providing power to the propulsion driveline, the control module being connected in operative control of the relay, and the control module being operable for engaging the park brake by de-energizing the relay.

16. Apparatus of claim 12, wherein the control module is programmed such that when the park brake is engaged and an engine of the windrower is operating, the control module is operable for permitting the operator to disengaging the park brake when the FNR lever is in the neutral position and a steering mechanism of the windrower is set within a predetermined range from a straight ahead position.

17. Apparatus of claim 12, wherein the control module is programmed to engage the park brake if a start switch in connection with the control module is in an off position.

18. Apparatus of claim 12, wherein the control module is programmed to engage the park brake if the FNR lever is in the neutral position and a seat switch indicates that an operator has not been seated on the seat for a predetermined time.

19. Apparatus of claim 12, wherein the FNR lever assembly includes a neutral switch in connection with the control module, the neutral switch having a first operating state when the FNR lever is in the neutral position and a second operating state when the FNR lever is out of the neutral position, and wherein the control module is programmed to automatically engage the park brake if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

20. Apparatus of claim 12, wherein the propulsion driveline includes a propulsion cylinder movable through a predetermined range of positions for effecting operation of the propulsion driveline within a predetermined range of speeds, and a sensor configured and operable for sensing a position of a propulsion cylinder and outputting signals representative thereof to the control module, and the control module being programmed to compare the signals representative of the positions of the propulsion cylinder to the signals representative of the positions of the FNR lever, and engaging the park brake if the signals representative of the positions of the propulsion cylinder do not correspond to the signals representative of the positions of the FNR lever so as to indicate that the propulsion cylinder is sticking in a position.

21. Apparatus of claim 12, comprising a key switch and a park brake switch in connection with the control module, and wherein the control module is programmed to allow starting of an engine only when the park brake switch is in a state for disengaging the park brake.

22. The apparatus of claim 12, wherein the at least one sensor is configured such that the signals outputted thereby are to have signal values within a predetermined range of values, and wherein the programmable control module is programmed and operable for monitoring the signals and comparing the values of the signals to the predetermined range, and if the value of any of the signals is outside of the predetermined range, then automatically engaging the park brake.

23. A method for providing an automatic park brake for an agricultural windrower, comprising steps of:
providing a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby as the FNR lever is moved are to change within a predetermined range of rates of change; and
providing a programmable control module in connection with the at least one sensor for receiving the signals therefrom, the control module being connected in operative control of a park brake of the windrower;
wherein the control module will:
monitor the signals and compare the rates of change thereof to the predetermined range of rates of change, and;
if any of the rates of change of the signals is outside of the predetermined range, then automatically engage the park brake.

24. The method of claim 23, comprising further steps of:
providing a relay energizable for providing power to a propulsion driveline of the windrower, the control module being connected in operative control of the relay, and wherein the control module will automatically de-energize the relay for engaging the park brake.

25. The method of claim 23, wherein the control module is programmed such that when the park brake is engaged and an engine of the windrower is operating, the control module will automatically enable the system permitting the operator to disengage the park brake when the FNR lever is in the neutral position and a steering mechanism of the windrower is set within a predetermined range from a straight ahead position.

26. The method of claim 23, wherein the control module will automatically engage the park brake if a start switch in connection with the control module is in an off position.

27. The method of claim 23, comprising a further step of:
engaging the park brake if the FNR lever is in the neutral position and a seat switch indicates that an operator has not been seated on an operator seat for a predetermined time.

28. The method of claim 23, comprising further steps of:
providing a neutral switch associated with the FNR lever and in connection with the control module, the neutral switch having a first operating state when the FNR lever is in the neutral position and a second operating state when the FNR lever is out of the neutral position; and
wherein the control module will automatically engage the park brake if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

29. The method of claim 23, comprising further steps of:
providing a propulsion cylinder movable through a predetermined range of positions for effecting operation of the propulsion driveline within a predetermined range of speeds;
providing a sensor configured and operable for sensing a position of a propulsion cylinder and outputting signals representative thereof to the control module; and
wherein the control module will compare the signals representative of the positions of the propulsion cylinder to the signals representative of the positions of the FNR lever, and automatically engage the park brake if the signals representative of the positions of the propulsion cylinder do not correspond to the signals representative of the positions of the FNR lever so as to indicate that the propulsion cylinder is sticking in a position.

30. The method of claim 23, comprising further steps of:
providing a key switch and a park brake switch in connection with the control module; and
wherein the control module will allow starting of an engine only when the park brake switch is in a state for disengaging the park brake.

31. A method for providing a park brake for a propulsion driveline of an agricultural windrower, comprising steps of:
providing a FNR lever assembly including a FNR lever having a neutral position and movable in relation to the neutral position in a first direction and in a second direction opposite the first direction;
providing at least one sensor disposed and operable for sensing positions of the FNR lever as the lever is moved in the first and second directions and outputting signals representative thereof, the at least one sensor being configured such that the signals outputted thereby are to have signal values within a predetermined range of values; and
providing a programmable control module in connection with the at least one sensor for receiving the signals therefrom, the control module being connected in operative control of a park brake of the windrower, and the control module being programmed and operable for:
monitoring the signals and comparing the values of the signals to the predetermined range, and;
if the value of any of the signals is outside of the predetermined range, then automatically engaging the park brake.

32. The method of claim 31, comprising further steps of:
providing a relay energizable for providing power to the propulsion driveline, the control module being connected in operative control of the relay, and wherein the control module will automatically de-energize the relay for engaging the park brake.

33. The method of claim 31, wherein the control module is programmed such that when the park brake is engaged and an engine of the windrower is operating, the control module will automatically disengage the park brake when the FNR lever is in the neutral position and a steering mechanism of the windrower is set within a predetermined range from a straight ahead position.

34. The method of claim 31, wherein the control module will automatically engage the park brake if a start switch in connection with the control module is in an off position.

* * * * *